No. 792,144. PATENTED JUNE 13, 1905.
N. H. & W. A. MILLER.
PROCESS OF MAKING HOMINY.
APPLICATION FILED MAY 7, 1904.

WITNESSES:
M. B. Schley
Claudia S. Gillespie

INVENTORS,
Nathan H. Miller
Willis A. Miller
BY
Shepherd & Parker
ATTORNEYS

No. 792,144. Patented June 13, 1905.

UNITED STATES PATENT OFFICE.

NATHAN H. MILLER AND WILLIS A. MILLER, OF PLEASANTVILLE, OHIO.

PROCESS OF MAKING HOMINY.

SPECIFICATION forming part of Letters Patent No. 792,144, dated June 13, 1905.

Application filed May 7, 1904. Serial No. 206,900.

*To all whom it may concern:*

Be it known that we, NATHAN H. MILLER and WILLIS A. MILLER, citizens of the United States, residing at Pleasantville, in the county of Fairfield and State of Ohio, have invented a certain new and useful Improvement in Processes of Making Hominy, of which the following is a specification.

Our invention relates to a new and useful improvement in processes for making hominy.

The process contemplates the production of a superior article and in such a manner as to liberate the sugar contained in the parts which are removed, which sugar is absorbed by the product, thereby highly flavoring the same.

Another object of the process is to produce hominy without materially affecting the hard part of the grain, as is common in processes now employed, where the grain is subjected to a steam-bath or softened by water, which is quite objectionable, as it softens and tends to disintegrate the hard part of the grain and to a great extent destroys the life thereof.

Another feature resides in so treating the grain as to entirely remove the hull and all other parts not necessary to the finished product without breaking the grain and at the same time polishing the hominy.

Our process may be employed with machines of various constructions; but for the purpose of more clearly presenting the invention we have shown a suitable machine in the annexed drawings, wherein—

Figure 1:
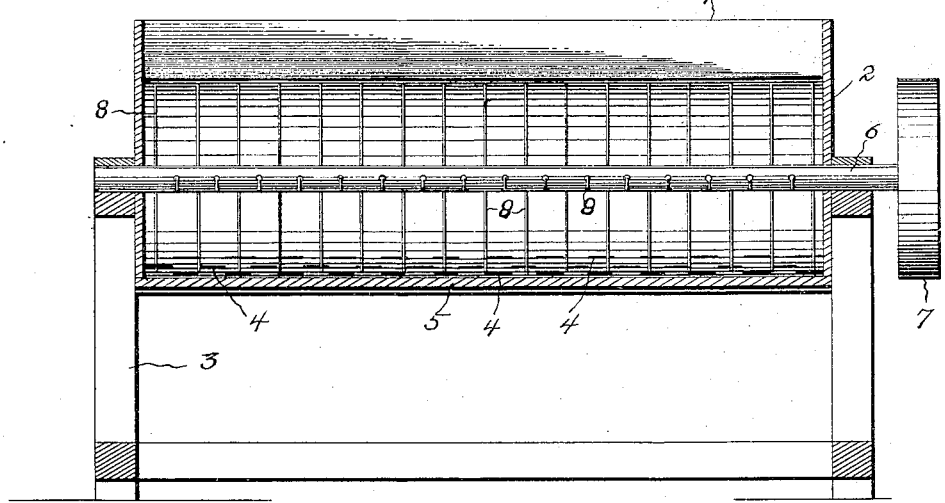
Figure 2:
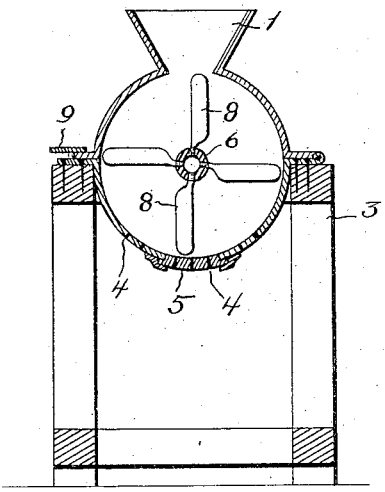

Figure 1 is a longitudinal vertical sectional view, and Fig. 2 is a transverse vertical sectional view.

In carrying out our process the corn is fed through a hopper 1 into a hinged cylinder 2, fixedly supported on a frame 3. The cylinder is formed in its bottom with slots 4 and a slide 5, by which the contents may be discharged. A shaft 6, driven by a suitable band-pulley 7, passes through the cylinder and supports a plurality of thin-bladed knives 8. A suitable swinging latch 9 for locking the cylinder together is provided. The filling of the cylinder with corn is continued until the same is completely filled and the corn densely massed therein. Then by moving the corn bodily around the cylinder through the medium of the thin-bladed knives which pass through the corn as they move the same frictional heat is generated. It is to be understood that the corn must be densely massed, so as to at all times completely fill the cylinder, and thus closely contact with the sides thereof. The degree of heat reached is quite high—indeed, so high that water poured upon the mass after it has been revolved for some time immediately turns to steam. This excessive degree of frictional heat is absolutely necessary, and we have found that the results cannot be obtained by any heating agent other than friction, as moistening or steaming the corn destroys the flavor thereof.

It is a well-known fact that corn in its natural state contains considerable sugar and water and that the revolving of the mass or body of corn around the cylinder obviously creates frictional heat which will reach a high degree, thus causing the water or moisture in the corn to vaporize and turn to steam. During this revolving action of the body of corn the thin-bladed knives, acting in conjunction with the slotted cylinder, tend to remove the hearts, germ, and all soft parts of the corn and acting to a great extent to remove the hulls, which matter, being thoroughly disintegrated, sifts through the openings or slots in the bottom of the cylinder. When the mass has been revolved to a point in the operation where the moisture in the corn vaporizes, due to the excessive frictional heat, a small quantity of cold water is suitably introduced by any means into the grain. This water acts to chill the mass of grain, thereby contracting and shriveling the hulls, but not affecting the hard part of the corn, as the quantity of water introduced is so small that it will, after acting on the hulls, turn to steam. This action tends to loosen the hulls, so that they are readily and effectually removed by the knives and the slotted portion of the casing. The vaporizing of the water in the corn and the introduction of the cold water into the mass dissolves the sugar contained in the corn, and especially that part contained in the soft portions, turning the same into a liquid, which percolating through the body of the corn thoroughly impregnates the hard part of the product, which so thoroughly absorbs the sugar as to highly flavor the same. When the mass has been revolved until the hulls and soft parts are entirely removed, it is taken from the cylinder and after being thoroughly cleaned by an air-blast is sacked.

It is to be understood that the action upon the grain is purely a cutting and rubbing action and not a breaking operation, as is common in the present method of producing hominy. The hominy produced by our process is seldom broken or cracked, but is finished in whole grains and has a crystal-like appearance, and owing to its absorption of the sugar has a sweet and palatable taste, thus greatly improving the product. It is to be further noted that quite a high degree of frictional heat must be obtained in order to vaporize the moisture in the grain and the water introduced into the cylinder.

Having now fully described our invention, what we claim, and desire to secure by Letters Patent, is—

1. A process for making hominy, consisting of first massing corn in a cylinder, second, revolving the corn bodily within the cylinder to produce frictional heat during which revolving operation the sugar of the corn is liberated and diffused into the hominy, and fourth, adding a small quantity of water to facilitate the hulling of the corn and the diffusion of the sugar.

2. In a process for making hominy comprising massing the corn in a body within a receptacle, then revolving the body of corn within the cylinder to frictionally heat the same to vaporize the moisture of the corn and liquefy the sugar thereof and partially remove the soft parts, then adding water to loosen the hulls and further liquefy the sugar, thence continuing the revolution of the corn to entirely remove all but the hard parts thereof and thoroughly impregnate the hominy with the sugar.

NATHAN H. MILLER.
WILLIS A. MILLER.

In presence of—
ONA MANSPERGER,
L. M. HEISTON.